United States Patent
Byun et al.

(10) Patent No.: US 7,994,851 B2
(45) Date of Patent: Aug. 9, 2011

(54) PSK DEMODULATOR USING TIME-TO-DIGITAL CONVERTER

(75) Inventors: Sang Jin Byun, Daejeon (KR); Jae Hoon Shim, Daejeon (KR); Hyun Kyu Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 68 days.

(21) Appl. No.: 12/511,323

(22) Filed: Jul. 29, 2009

(65) Prior Publication Data

US 2010/0090761 A1  Apr. 15, 2010

(30) Foreign Application Priority Data

Oct. 15, 2008  (KR) .................. 10-2008-0101061

(51) Int. Cl.
*H04L 27/06* (2006.01)
*H03D 3/18* (2006.01)
(52) U.S. Cl. ...................... 329/310; 329/304
(58) Field of Classification Search .................. 331/310, 331/304; 329/310, 304
See application file for complete search history.

(56) References Cited

U.S. PATENT DOCUMENTS

| | | | |
|---|---|---|---|
| 5,121,070 A * | 6/1992 | Tomita | 329/304 |
| 5,436,591 A * | 7/1995 | Henze | 329/304 |
| 5,777,511 A * | 7/1998 | Masumoto et al. | 329/304 |
| 6,341,146 B1 | 1/2002 | Johnson et al. | |
| 6,914,478 B2 | 7/2005 | Takasu et al. | |
| 7,079,600 B2 | 7/2006 | Byun et al. | |
| 2008/0129574 A1 | 6/2008 | Choi et al. | |

OTHER PUBLICATIONS

Aarno Pärssinen, "A 2GHz Wideband Direct Conversion Receiver for WCDMA Applications," IEEE Journal of Solid-State Circuits, 1999, pp. 1893-1903, vol. 34, No. 12, IEEE.

* cited by examiner

*Primary Examiner* — Joseph Chang (57) ABSTRACT

A PSK demodulator using a time-to-digital converter includes: a filter unit that performs band pass filtering on a PSK signal; an amplitude limiting unit that limits the amplitude of an output signal of the filter unit; a clock signal generating unit that generates a clock signal; and a time-to-digital converter that samples the phase of an output signal of the amplitude limiting unit according to the clock signal and outputs a digital signal having a value corresponding to the phase of the PSK signal. Power consumption can be reduced and a circuit implementation can be simplified.

6 Claims, 6 Drawing Sheets

PSK DEMODULATOR USING TIME-TO-DIGITAL CONVERTER

CROSS-REFERENCE TO RELATED APPLICATIONS

This application claims the priority of Korean Patent Application No. 2008-101061 filed on Oct. 15, 2008, in the Korean Intellectual Property Office, the disclosure of which is incorporated herein by reference.

BACKGROUND OF THE INVENTION

1. Field of the Invention

The present application relates to a phase shift keying (PSK) demodulator and, more particularly, to a PSK demodulator using a time-to-digital converter capable of a low level of power consumption and simple implementation.

2. Description of the Related Art

The related art PSK demodulator includes an I/Q analog-to-digital converter and a digital signal processor, in which a received PSK signal is converted into a digital signal via the I/Q analog-to-digital converters and the digital signal is then demodulated by the digital signal processor.

However, the I/Q analog-to-digital converter consumes large amounts of power and contains complicated circuitry, resulting in an increase in overall power consumption of the related art PSK demodulator and complicating the implementation of the PSK demodulator.

In an effort to solve the problem, a frequency shift keying (FSK) demodulator using a delay locked loop (DLL), a PSK demodulator using a period-width detector, and the like, have been proposed. However, these demodulators must necessarily have a synchronization circuit for synchronizing a PSK signal and a clock signal. Therefore, the proposed demodulators also have the same problem: increased power consumption and a complicated implementation process due to the presence of the synchronization circuit.

SUMMARY OF THE INVENTION

An aspect of the present application provides a phase shift keying (PSK) demodulator using a time-to-digital converter capable of consuming low amounts of power and being simply implemented without the necessity of a synchronization circuit.

According to an aspect of the present application, there is provided a PSK demodulator using a time-to-digital converter, including: a filter unit that performs band pass filtering on a PSK signal; an amplitude limiting unit that limits the amplitude of an output signal of the filter unit; a clock signal generating unit that generates a clock signal; and a time-to-digital converter that samples the phase of an output signal of the amplitude limiting unit according to the clock signal and outputs a digital signal having a value corresponding to the phase of the PSK signal.

The clock signal generating unit may generate m number of clock signals having m (m is a natural number) number of phases, and if necessary, the clock signal generating unit may have a function of adjusting the frequency of the m number of clock signals such that it is the same as or faster than the frequency of the PSK signal.

The time-to-digital converter may include m number of D-flip-flops that sample the output signal of the amplitude limiting unit in response to each of them number of clock signals, and output a digital signal of m bits, and if necessary, the time-to-digital converter may further include an encoder that reduces the number of bits of the digital signal outputted from the D-flip-flops.

The time-to-digital converter may further include a parallel-to-parallel converter that increases the number of bits of digital signals outputted after being collected by q (q is a positive integer) times from the D-flip-flops, and outputs the same.

The clock signal generating unit may generate a clock signal having a frequency faster than that of the PSK signal.

The time-to-digital converter may include a D-flip-flop that outputs a data value corresponding to a signal level of the output signal from the amplitude limiting unit in response to the clock signal; and a serial-to-parallel converter that performs serial-to-parallel conversion on a serial output signal from the D-flip-flop into a parallel digital signal, and if necessary, the time-to-digital converter may further include an encoder that reduces the number of bits of the digital signal outputted from the serial-to-parallel converter.

BRIEF DESCRIPTION OF THE DRAWINGS

The above and other aspects, features and other advantages of the present application will be more clearly understood from the following detailed description taken in conjunction with the accompanying drawings, in which.

DETAILED DESCRIPTION OF THE PREFERRED EMBODIMENT

Exemplary embodiments of the present application will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

In addition, unless explicitly described to the contrary, the word "comprise" and variations such as "comprises" or "comprising," will be understood to imply the inclusion of stated elements but not the exclusion of any other elements.

Figure 1:
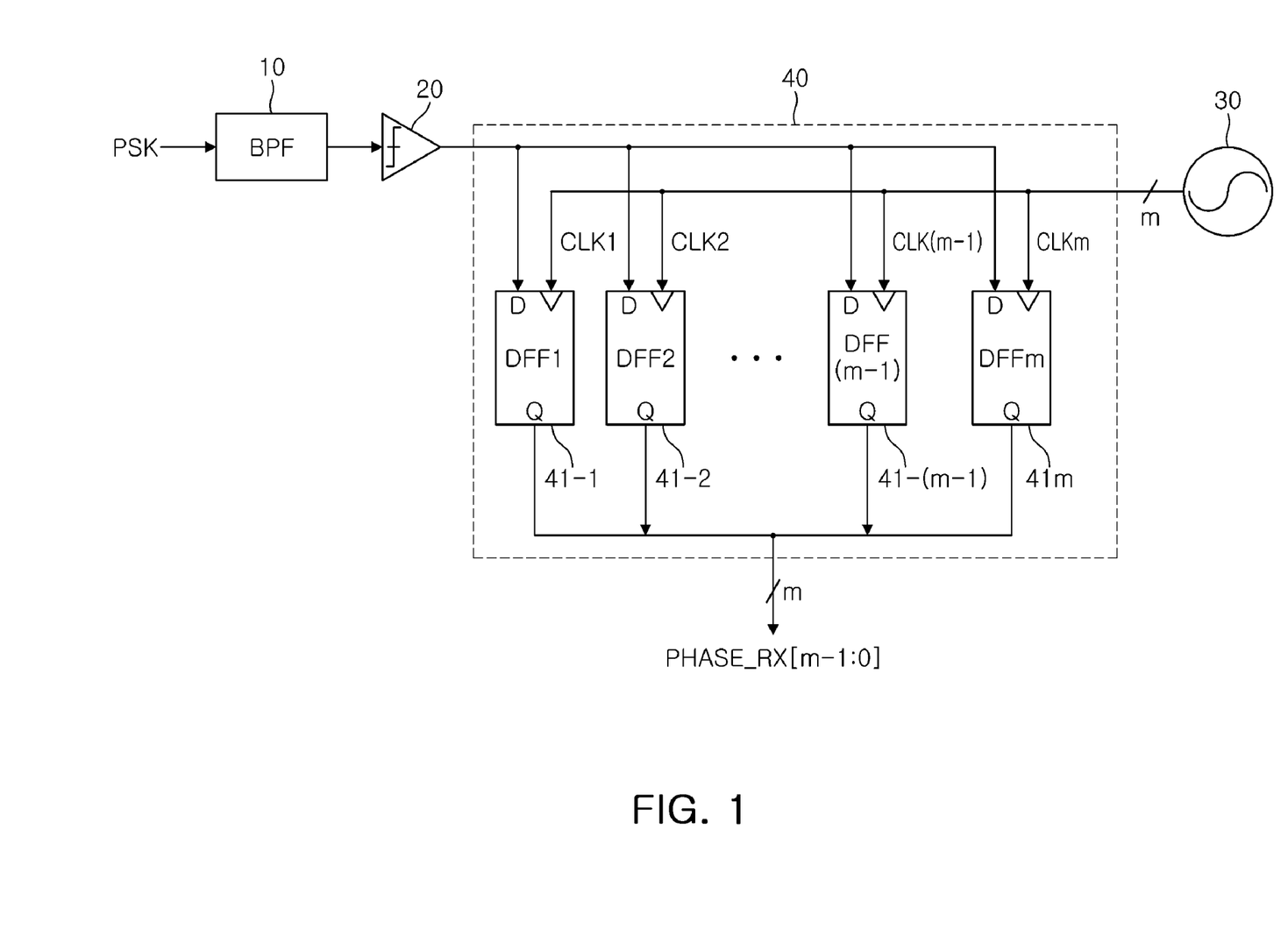
FIG. 1 is a schematic block diagram of a phase shift keying (PSK) demodulator using a time-to-digital converter according to an embodiment of the present application.

FIG. 1 is a schematic block diagram of a phase shift keying (PSK) demodulator using a time-to-digital converter according to an embodiment of the present application.

With reference to FIG. 1, the PSK demodulator includes a band pass filter (BPF) 10, an amplitude limiting unit 20, a multi-phase clock generating unit 30, and a time-to-digital converter (TDC) 40.

The elements have the following functions.

The BPF 10 filters a PSK signal inputted to the PSK demodulator to allow only a signal band that can be recognized by the PSK demodulator to pass therethrough.

The amplitude limiting unit 20 limits the amplitude of the PSK signal which has been filtered by the BPF 10. Preferably, the PSK signal having the amplitude limited by the amplitude limiting unit 20 is a square wave signal.

The multi-phase clock generating unit 30 generates m number of clock signals CLK1 to CLKm having m (m is a natural number) number of phases. If necessary, the frequency of the m number of clock signals CLK1 to CLKm may be adjusted to be the same as or faster than the frequency (in particular, center frequency) of the PSK signal.

Namely, the multi-phase clock generating unit 30 may adjust the frequency and the number of phase of the clock signals CLK1 to CLKm to adjust the resolution of the TDC 40. For example, the multi-phase clock generating unit 30 may generate clock signals CLK1 to CLKm having the m number of phases, so that the TDC 40 may sample one period of the PSK signal by m number of times, or the multi-phase clock generating unit 30 may generate clock signals having a frequency faster by k times (k is a positive integer) than that of the PSK signal and having m number of phases, so that the TDC 40 may sample one period of the PSK signal by k×m number of times.

The TDC 40 is implemented as m number of D-flip-flops (DFFs) 41-1 to 41-$m$ each outputting a data value corresponding to a signal level of the output signal of the amplitude limiting unit 20 in response to each of the m number of clock signals CLK1 to CLKm. The TDC 40 samples one period of the output signal of the amplitude limiting unit by m number of times via the m number of DFFs 41-1 to 41-$m$, to output an m-bit digital signal having a value corresponding to the phase of the PSK signal inputted to the PSK demodulator.

In addition, in order to increase the efficiency of a data transmission, the TDC 40 may further include a parallel-to-parallel converter (not shown) at a rear stage of the m number of DFFs 41-1 to 41-$m$ to collect the m-bit digital signals by q number of times (q is a positive integer), convert them into digital signals with a data amount of m×q, and output the same.

Namely, the TDC 40 may collect the m-bit digital signals, outputted from the m number of DFFs 41-1 to 41-$m$, by the q number of times, convert them into the digital signals with the data amount of m×q, and output the converted digital signals via the added parallel-to-parallel converter.

In this case, the value q may be set or varied according to operational characteristics of a circuit employing the PSK demodulator.

Figure 2:
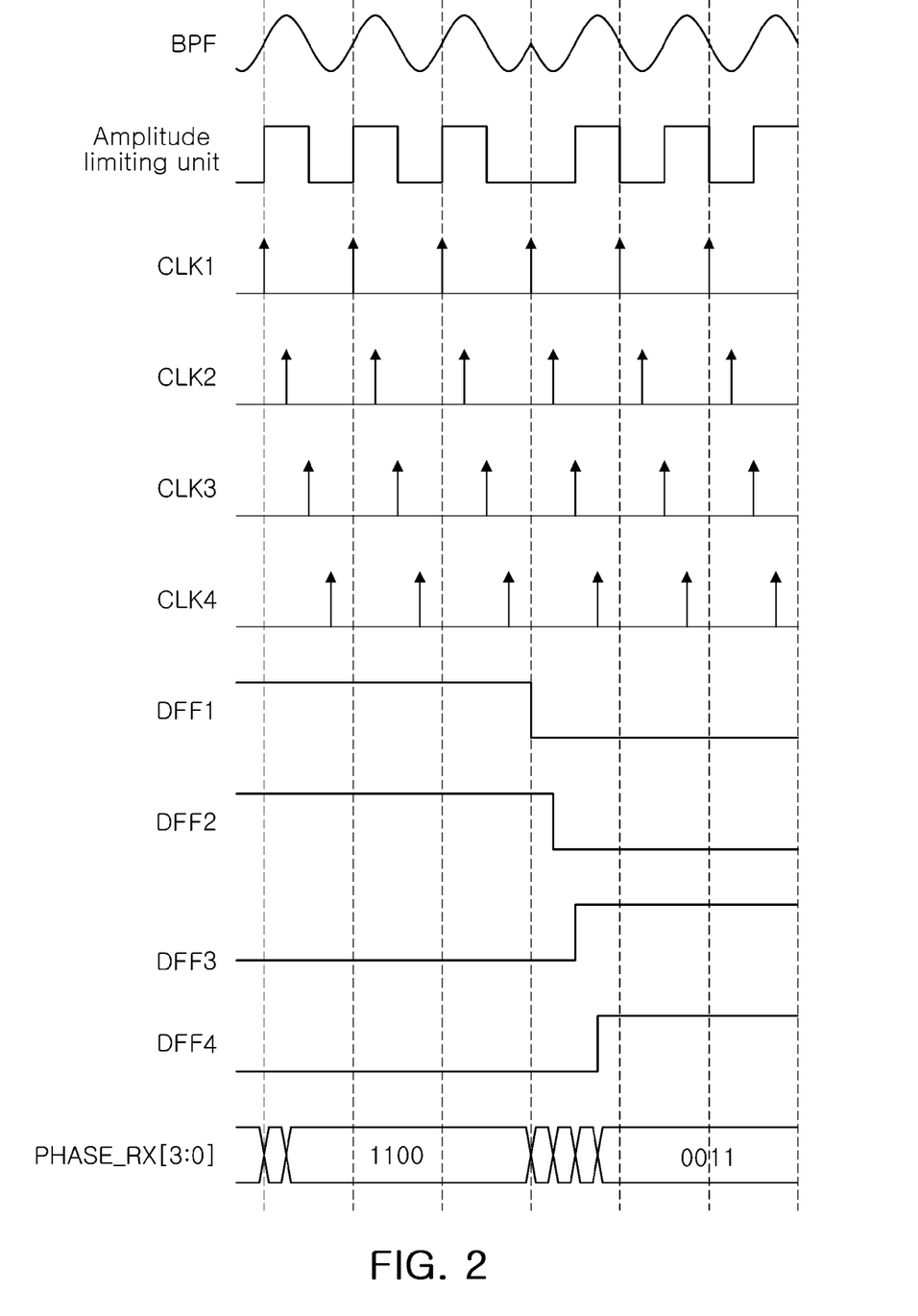
FIG. 2 illustrates signal waveforms for explaining a demodulation operation of the PSK demodulator of FIG. 1.

FIG. 2 illustrates signal waveforms for explaining a demodulation operation of the PSK demodulator of FIG. 1.

With reference to FIG. 2, it is assumed that the phase of the PSK signal inputted to the PSK demodulator transitions from 0° to 180°, the multi-phase clock generating unit 30 generates four clock signals CLK1 to CLK4 having the same frequency as that of the PSK signal and four phases (e.g., 0°, 90°, 180°, and 270°), and the TDC 40 is implemented as four DFFs 41-1 to 41-4, for convenience of explanation.

First, when a PSK signal with a phase 0° is inputted to the PSK demodulator, the BPF 10 and the amplitude limiting unit 20 perform band-pass-filtering on the PSK signal and limit the amplitude of the filtered signal, respectively.

The DFF1 to DFF4 41-1 to 41-4 sample one period of the output signal from the amplitude limiting unit 20 four times according to the four clock signals CLK1 to CLK4 having the four phases (i.e., 0°, 90°, 180°, and 270°), and output a 4-bit digital signal digital signal (PHASE_RX[3:0]) having a value '1100' as the sampling result.

In this state, if the phase of the PSK signal is shifted by 180°, reversing a period '1' and a period '0', each of the DFF1 41-1 to DFF4 41-4 starts to output changed data values in response to the shifted phase of the PSK signal.

Namely, in response to the phase-shifted PSK signal, the DFF1 41-1 starts to output a changed data value '0', the DFF2 41-2 starts to output a changed data value '0', the DFF3 41-3 starts to output a changed data value '1', and the DFF1 41-4 starts to output a changed data value '1', respectively.

That is, the 4-bit digital signal (PHASE_RX[3:0]) outputted via the DFF1 to DFF4 41-1 to 41-4 changes to '0100', '0000', '0010', and finally has the value of '0011'.

Accordingly, if the phase of the PSK signal via the DFF1 to DFF4 41-1 to 41-4 is 0°, the TDC 40 outputs '1100', and if it is 180°, the TDC 40 outputs '0011'.

Although not shown in FIG. 2, this operational principle is applied in the same manner to the PSK signal having the other remaining phases. That is, if the PSK signal has the phase of 90°, the TDC 40 outputs the digital signal (PHASE_RX[3:0]) having the value '1001', and if the PSK signal has the phase of 270°, the TDC 40 outputs the digital signal (PHASE_RX [3:0]) having the value '1100'.

However, the TDC 40 can sample the PSK signal in response to the m number of clock signals CLK1 to CLKm, the PSK demodulator performing the demodulation operation on the PSK signal by using the TDC 40 does not need to have a synchronization circuit.

Thus, the PSK demodulator using the time-to-digital converter according to the embodiment of the present application can perform the normal demodulation operation without the necessity of a synchronization circuit.

Figure 3:
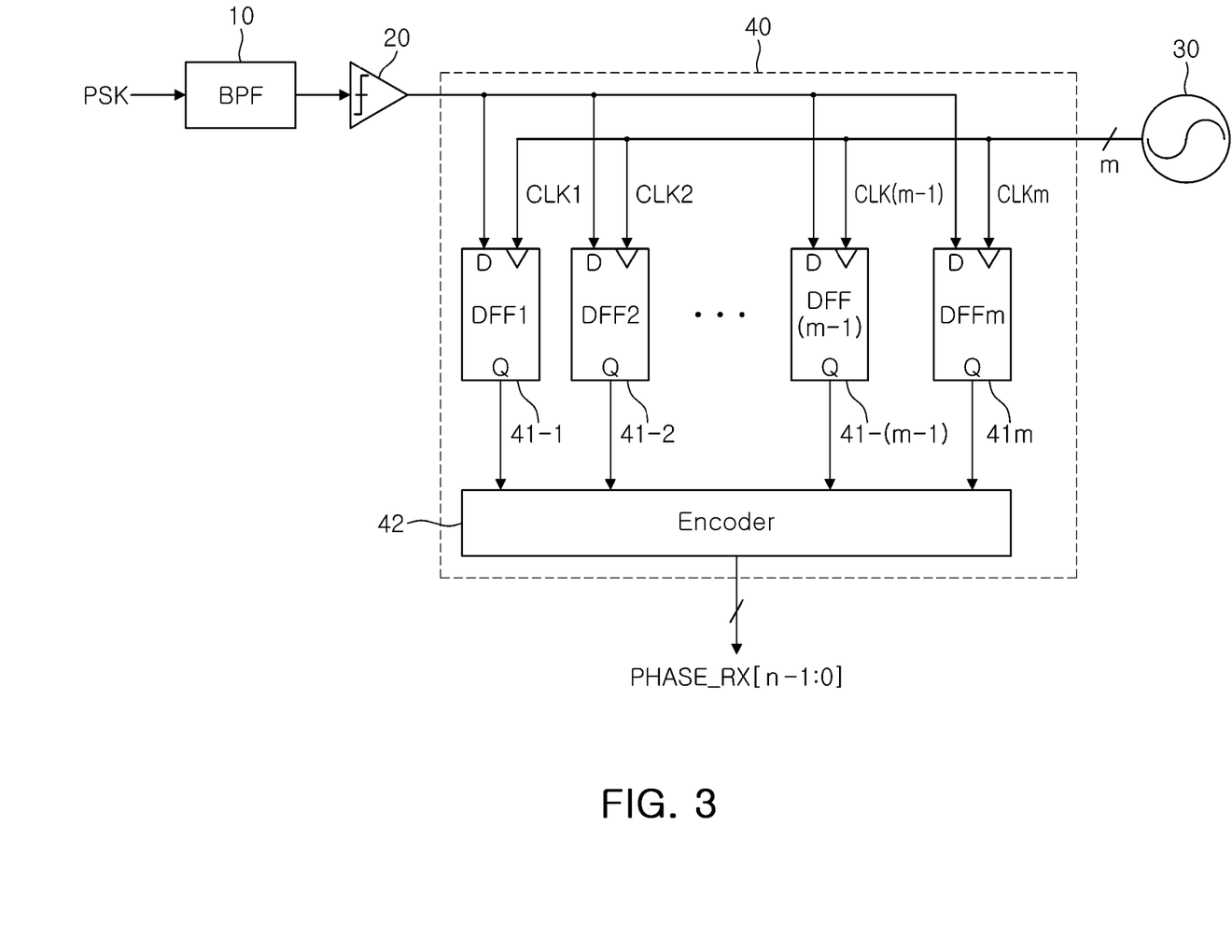
FIG. 3 is a schematic block diagram of a phase shift keying (PSK) demodulator using a time-to-digital converter according to another embodiment of the present application.

FIG. 3 is a schematic block diagram of a phase shift keying (PSK) demodulator using a time-to-digital converter according to a second embodiment of the present application; which is aimed at reducing the amount of data contained in an output signal of the PSK demodulator.

As shown in FIG. 3, the TDC 40 further includes an encoder 42 in addition to the m number of DFFs 41-1 to 41-$m$.

The encoder 42 encodes m-bit digital signals (PHASE_RX [m-1:0]) outputted from the m number of DFFs 41-1 to 41-M into n-bit (n is a natural number having a value smaller than m) digital signals (PHASE_RX[n-1:0]).

Namely, the encoder 42 serves to reduce the amount of data of the digital signals (PHASE_RX[m-1:0]) outputted from the m number of DFFs 41-1 to 41-$m$ from m bits to n bits.

As a result, the PSK demodulator of FIG. 3 outputs the digital signals having the values corresponding to the phases of the PSK signals as shown in FIG. 1 and the reduced amount of data.

Thus, because the PSK demodulator of FIG. 3 reduces the amount of data of the digital signals (PHASE_RX[m-1:0]), the PSK demodulator can reduce a processing capacity of a circuit (i.e., a circuit that performs an operation upon receiving the digital signals (PHASE_RX[m-1:0]) connected at a rear stage of the PSK demodulator).

Figure 4:
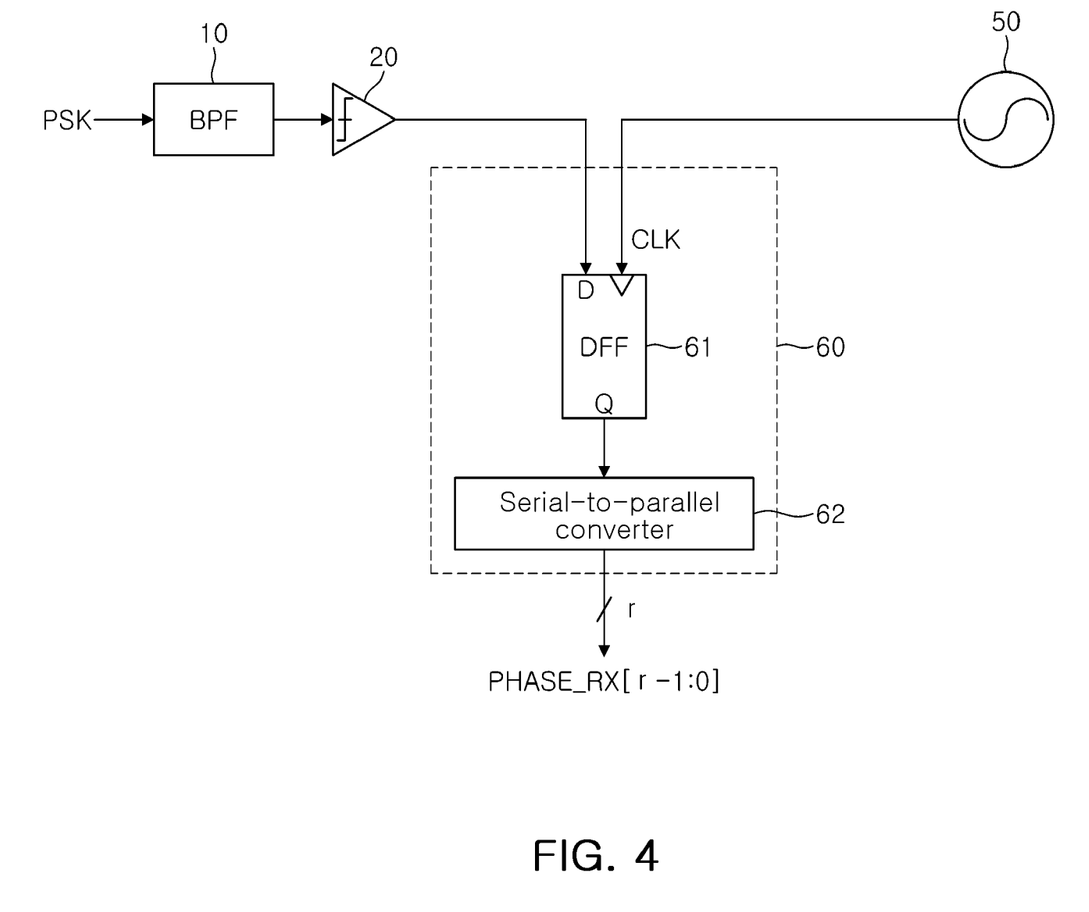
FIG. 4 is a schematic block diagram of a phase shift keying (PSK) demodulator using a time-to-digital converter according to another embodiment of the present application.

FIG. 4 is a schematic block diagram of a phase shift keying (PSK) demodulator using a time-to-digital converter according to a third embodiment of the present application.

As shown in FIG. 4, the PSK demodulator includes a high speed clock generating unit 50 and a TDC 60 having a DFF 61 and a serial-to-parallel converter 62, replacing the multi-phase clock generating unit 30 and the TDC 40 in FIG. 1.

The same reference numerals as those of FIG. 1 are used for the elements in FIG. 4 which are configured and operated in the same manner as those in FIG. 1, and its detailed description will be omitted.

The high speed clock generating unit 50 generates a clock signal CLK having a faster frequency than a center frequency of a PSK signal.

Namely, the high speed clock generating unit 50 may adjust the resolution of the TDC 60 by adjusting the frequency of the clock signal CLK. For example, the high speed clock generating unit 50 may generate the clock signal CLK having a frequency faster by r (r is a positive integer) times than that of the PSK signal, and adjust such that one period of the PSK signal is sampled by r times.

The TDC 60 includes the DFF 61 for outputting a data value corresponding to a signal level of the output signal from the amplitude limiting unit 20 in response to the clock signal CLK, and the serial-to-parallel converter 62 for parallel-converting a signal outputted in series from the DFF 61 and converting it into an r-bit digital signal.

That is, the TDC 60 samples one period of the output signal of the amplitude limiting unit 20 by r number of times via the DFF 61 and then parallel-converts the sampled signal via the serial-to-parallel converter 62 to output the r-bit digital signal (PHASE_RX[r-1:0]) having a value corresponding to the phase of the PSK signal which has been inputted to the PSK demodulator.

Figure 5:
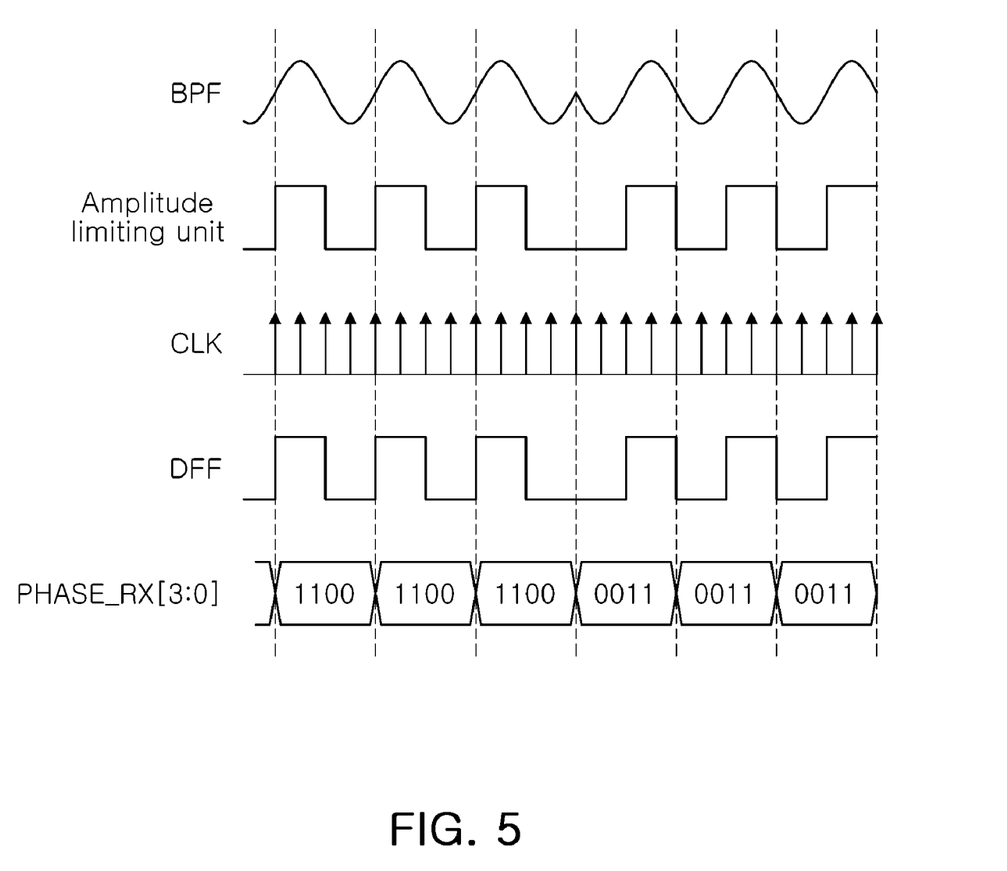
FIG. 5 illustrates signal waveforms for explaining a demodulation operation of the PSK demodulator of FIG. 4.

FIG. 5 illustrates signal waveforms for explaining a demodulation operation of the PSK demodulator of FIG. 4.

With reference to FIG. 5, it is assumed that the phase of the PSK signal inputted to the PSK demodulator is shifted from 0° to 180°, and the high speed clock generating unit 50 generates a clock signal CLK having a frequency faster by four times than that of the PSK signal, for convenience of explanation.

First, when the PSK signal with the phase 0° is inputted to the PSK demodulator, the BPF 10 and the amplitude limiting unit 20 performs band-pass-filtering on the PSK signal and then limits the amplitude of the filtered signal, respectively.

The DFF 61 samples one period of the output signal of the amplitude limiting unit 20 four times according to the clock signal CLK to serially output data values of '1', '1', '0', and '0', and the serial-to-parallel converter 62 performs parallel conversion on the data values to output a 4-bit digital signal (PHASE_RX[3:0]) having a value of '1100'.

In this state, when the phase of the PSK signal is shifted by 180°, reversing a period '1' and a period '0', the DFF 61 starts to output changed data values according to the changed phase of the PSK signal.

Namely, the DFF 61 starts to serially output the changed data values '0', '0', '1', and '1', and the serial-to-parallel converter 62 outputs the 4-bit digital signal (PHASE_RX[3:0]) having the value '0011' in response thereto.

In this manner, the TDC 60 can sample the PSK signal by using the clock signal CLK having the faster frequency than that of the PSK signal, therefore, the PSK demodulator performing the demodulation operation on the PSK signal by using the TDC 60 does not need to have a synchronization circuit.

Thus, like the PSK demodulator of FIG. 1, the PSK demodulator of FIG. 4 also does not need a synchronization circuit.

Figure 6:
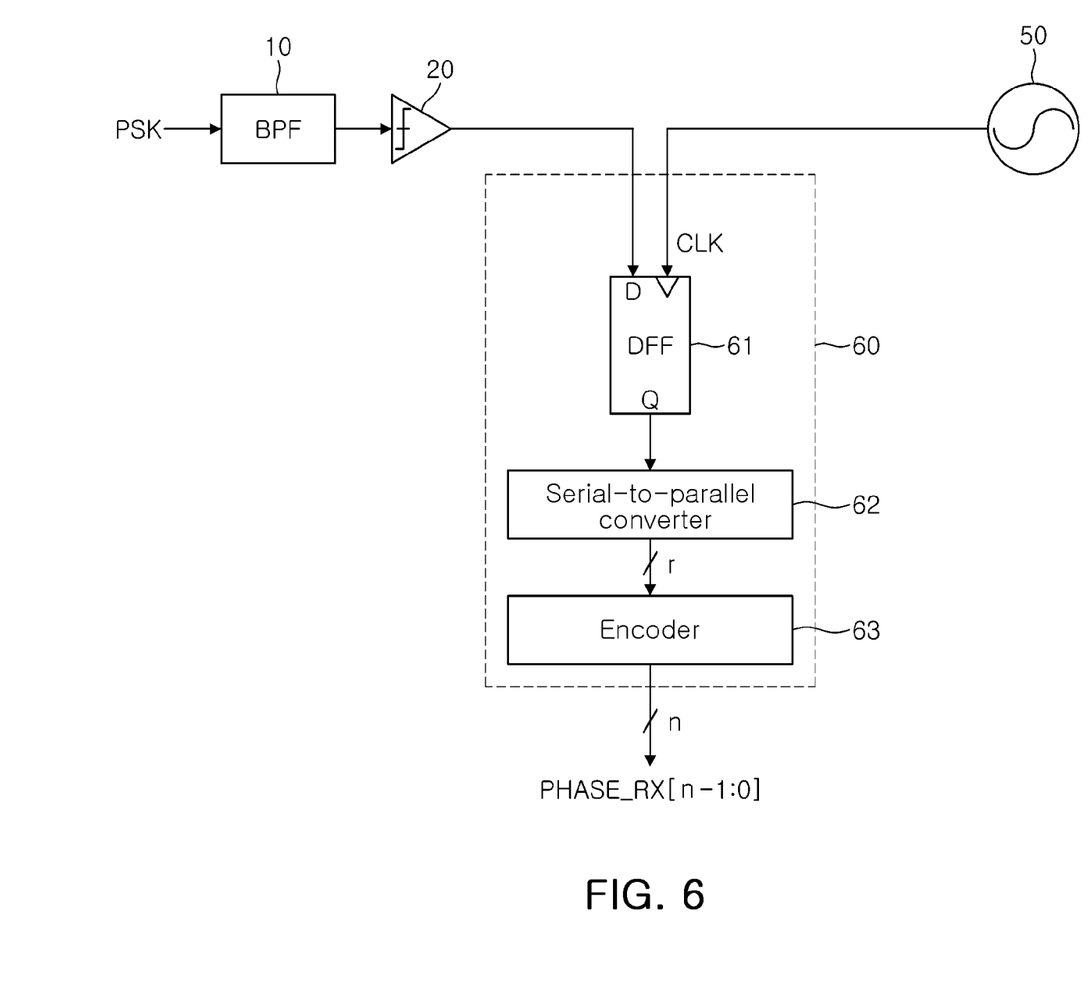
FIG. 6 is a schematic block diagram of a phase shift keying (PSK) demodulator using a time-to-digital converter according to a fourth embodiment of the present application.

Of course, if necessary, the PSK demodulator of FIG. 4 may include an encoder 63 at a rear stage of the serial-to-parallel converter 62 as shown in FIG. 6 to reduce a data amount of the outputted digital signals (PHASE_RX[r-1:0]).

As set forth above, according to exemplary embodiments of the invention, the PSK demodulator uses the time-to-digital converter that performs a sampling operation according to clock signals (i.e., m number of clock signals having the m number of phases or a high speed clock signal) asynchronized with a PSK signal, so it does not require a synchronization circuit for synchronizing the PSK signal and the clock signals.

Thus, because the PSK demodulator using the time-to-digital converter does not use a synchronization circuit, it consumes less power and is able to be simply implemented.

While the present application has been shown and described in connection with the exemplary embodiments, it will be apparent to those skilled in the art that modifications and variations can be made without departing from the spirit and scope of the invention as defined by the appended claims.

What is claimed is:

1. A phase shift keying (PSK) demodulator, comprising:
    a filter unit configured to perform band pass filtering on a PSK signal;
    an amplitude limiting unit configured to limit the amplitude of an output signal of the filter unit;
    a clock signal generating unit configured to generate m number of clock signals having m number of phases, m being a natural number equal to or greater than 2; and
    a time-to-digital converter including m number of D-flip-flops and configured to sample the phase of an output signal of the amplitude limiting unit in response to the m number of clock signals and to output a digital signal of m bits, which has a value corresponding to the phase of the PSK signal.

2. The demodulator of claim 1, wherein the clock signal generating unit has a function of adjusting frequencies of the m number of clock signals such that the frequencies of the clock signals are the same as or faster than a frequency of the PSK signal.

3. The demodulator of claim 1, wherein the time-to-digital converter further comprises:
    an encoder configured to reduce the number of bits of the digital signal outputted from the D-flip-flops.

4. The demodulator of claim 1, wherein the time-to-digital converter further comprises:
    a parallel-to-parallel converter configured to increase the number of bits of digital signals outputted after being collected by q (q is a positive integer) times from the D-flip-flops.

5. A phase shift keying (PSK) demodulator, comprising:
    a filter unit configured to perform band pass filtering on a PSK signal;
    an amplitude limiting unit configured to limit the amplitude of an output signal of the filter unit;
    a clock signal generating unit configured to generate a clock signal that has a frequency faster by r times than that of the PSK signal, r being a positive integer equal to or greater than 2; and
    a time-to-digital converter configured to sample the phase of an output signal of the amplitude limiting unit in response to the clock signal and to output a digital signal having a value corresponding to the phase of the PSK signal,
    wherein the time-to-digital converter comprises:
        a D-flip-flop configured to output a data value corresponding to a signal level of the output signal from the amplitude limiting unit in response to the clock signal; and a serial-to-parallel converter configured to perform serial-to-parallel conversion on an output signal from the D-flip-flop to output the digital signal of r bits.

6. The demodulator of claim 5, wherein the time-to-digital converter further comprises:

an encoder configured to reduce the number of bits of the digital signal outputted from the serial-to-parallel converter.

* * * * *